May 9, 1944. W. W. HODGSON 2,348,542
KEY OPENING SHEET METAL CONTAINER
Filed June 8, 1942
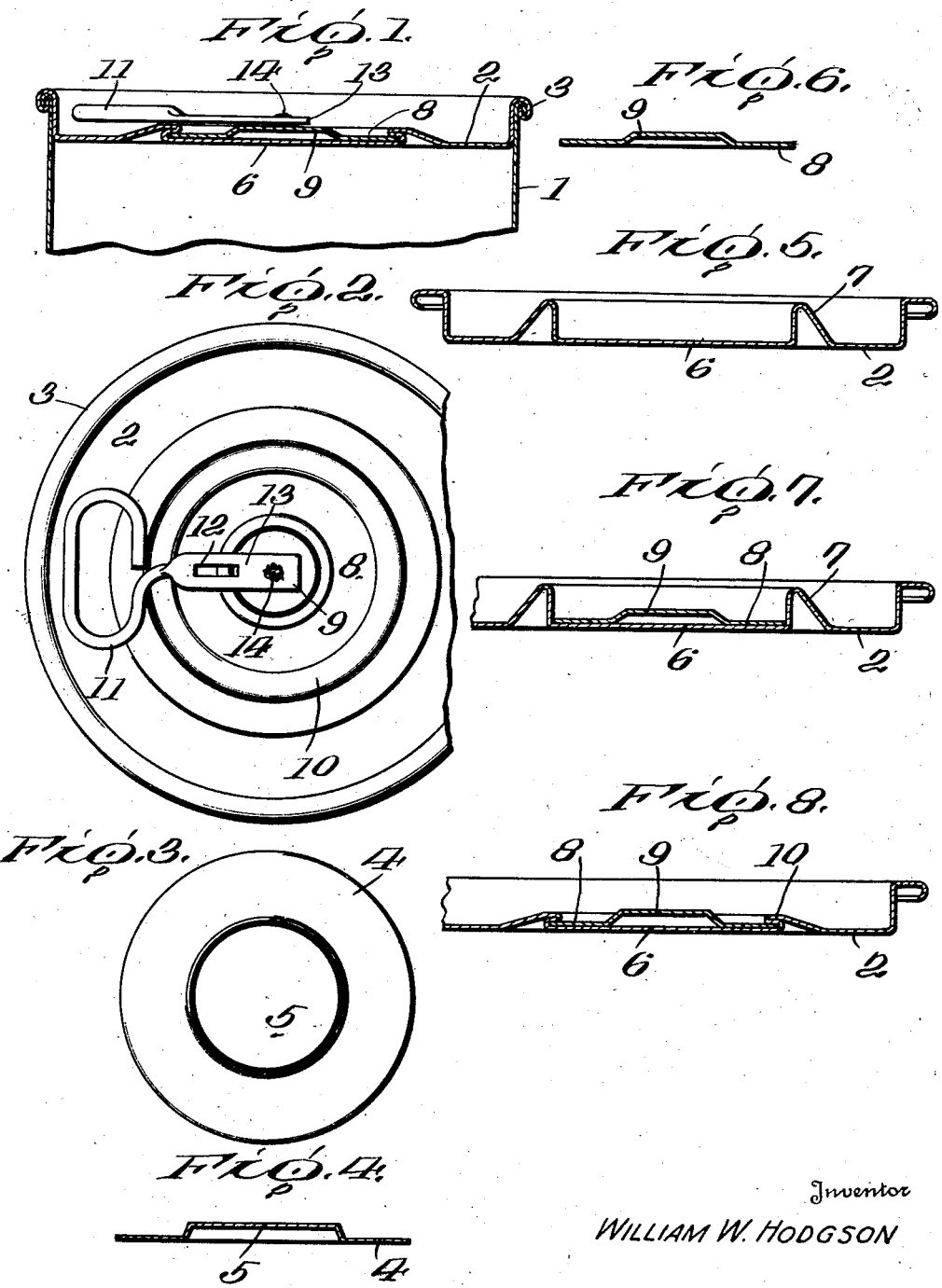
Inventor
WILLIAM W. HODGSON
By Mason, Porter, Diller
Attorneys Patented May 9, 1944

2,348,542

UNITED STATES PATENT OFFICE 2,348,542

KEY OPENING SHEET METAL CONTAINER

William W. Hodgson, Chicago, Ill., assignor to Continental Can Company, Inc., New York, N. Y., a corporation of New York Application June 8, 1942, Serial No. 446,219

1 Claim. (Cl. 220—52)

The invention relates to a new and useful improvement in a key-attaching means for the rip strip type of container. There are three methods of attaching keys for opening containers of sheet metal to the containers so that they become an assembled unit with said containers. One is to shape the key or the wall of the container so as to frictionally grip the key and hold it in engagement with the container. The second is to solder bond the key to the container, and the third is to spot weld the key to the container. The solder bonding of the key to the wall of the container has some advantages over the other methods in that it is not likely to injure the metal part to which it is attached and at the same time the key is firmly attached and can be readily released from its attachment for use. Difficulty has been found, however, in the attaching of a key to a sheet metal container made of black plate by the solder bonding method as it is difficult to secure a solder bond between the key and the steel plate which will hold the key firmly so that it does not become dislodged during handling of the container.

An object of the present invention is to provide a means for securing a key to a container made of black plate by solder bonding so that the key may be firmly held on the container and not dislodged during handling and at the same time may be released by applying strain, which ruptures the solder bond.

In the drawing,

Figure 1 is a sectional view through the upper portion of a rip strip container having a key attached thereto by my improved means, Figure 2 is a plan view of the upper end of the same, Figure 3 is a plan view of a sheet metal blank which has been shaped so as to provide a raised portion centrally thereof, Figure 4 is an edge view of the blank shown in Figure 3, Figure 5 shows the blank after it has been subjected to a second die-shaping operation which produces a depression in the raised portion surrounded by a wall which is substantially at right angles to the plane of the blank, Figure 6 is a sectional view of a sheet metal disk which is used for attaching the key to the container end, Figure 7 is a sectional view showing the disk placed in the recess in the container end, and Figure 8 is a view similar to Figure 7, but showing the metal surrounding the depression as deformed inwardly so that the wall of the depression overlies the disk and firmly secures the disk to the container end.

The container to which the invention is applied is of the ordinary rip strip type where the body wall is scored along parallel lines and is provided with a projecting tongue at the side seam to which a key may be attached so that the tongue may be rolled onto the key and the tearing strip removed by a turning of the key. The container includes a cylindrical body portion 1 having a closure end 2 secured thereto by double seaming, as indicated at 3. The container body may be made of black plate coated with a suitable decorative enamel. The closure end 2 is likewise made of black plate and this end may be also coated with enamel. The blank from which the closure end is formed is shown at 4 in Figures 3 and 4 of the drawing. The blank has not only been cut to proper shape for making the end, but has been subjected to a die operation for forming a raised portion 5. The blank is then subjected to a second die operation as indicated in Figure 5 in which the raised portion 5 is provided with a depression 6 surrounded by a substantially vertical wall 7. This die-shaping of the blank in the central portion thereof may be accomplished simultaneously with the usual shaping of the end and the forming of a channel portion which is to be double seamed to the container body. As noted above, the closure end 2 which is formed from the blank may be made of black plate.

A disk 8 is cut from scrap tin plate. Said disk is provided with a raised portion 9 which may be formed in the center of the disk or it may be otherwise placed in the disk. It is essential, however, that there shall be a slightly raised portion 9 formed in the disk to which a key is to be attached, as will be hereinafter described. This disk is shaped so that it fits loosely in the depression formed in the container end. After the disk is placed in the depression, then the rib or raised portion surrounding the depression is subjected to a shaping die so that the rib is deformed inwardly to provide a folded clamping lip 10 which overlies the peripheral edge of the disk 8 and firmly secures the disk to the closure end. The raised portion 9 is so dimensioned that when this folded rib is pressed down against the disk the top surface of the raised portion 9 lies substantially in the same plane as the top surface of the rib 10.

After the end has been constructed in the manner described and the disk secured thereto, then the key for opening the container which is indicated at 11 is solder bonded to this disk. The key is of the usual construction and has a slot 12 therethrough which is placed over the tongue so that the rip strip may be wound onto the key, severing the metal and releasing the closure end from the container. The key has an extended shank 13 which is preferably provided with a small opening 14 therethrough. This shank is flat and is placed on the flat raised portion 9 of the disk 8. A drop of solder is placed in the opening 14 and this will solder bond the key to the tin plate disk 8.

It is well known that when a sheet of metal is coated with tin that solder will readily bond therewith. The solder bond between the key and the tin plate disk may be of such strength as to hold the key firmly attached to the end without the key becoming dislodged during the handling of the container. When it is desired to remove the key the operator, grasping the handle, will raise and twist the key to break the solder bond. When the key is raised and twisted for rupturing the solder bond the tin plate disk 8 is not disturbed from its connection to the black iron closure end. The folded down rib 10 secures the disk so firmly to the closure end that it will not be dislodged during the rupturing of the solder bond.

This tin plate disk, as noted, is very small as it is only necessary to be of sufficient dimensions to permit the folding of the raised portion of the closure end onto the disk for firmly securing the same to the end and so as to permit a raised portion to be formed in the disk to which the key may be solder bonded.

It is obvious that instead of providing a depression in the center of the end, it may be placed otherwise in the closure end. It is also obvious that other means may be provided for attaching the tin plate disk to the black iron closure end so that it becomes a unit with the closure end. It will be further obvious that the container instead of being round, may be otherwise shaped. The essential features consist in providing a wall of the black iron sheet metal container with a structural means for firmly securing a tin-plated member thereto so that the key may be solder bonded to the tin-plated member and thus firmly secured to the container.

What I claim is:

A sheet metal key opening container including a closure end of black plate, said closure end having a circular depression formed therein centrally thereof, a key attaching tin coated disk located in said depression, the wall of said depression being deformed inwardly so as to overlie the disk and permanently connect said disk to the closure end, said disk having a raised portion lying substantially in the plane of the upper surface of the deformed portion of the closure, a key for opening the container overlying said deformed portion of the closure end and said disk and solder bonded to said disk.

WILLIAM W. HODGSON.